US009848336B2

(12) United States Patent
Ueng et al.

(10) Patent No.: US 9,848,336 B2
(45) Date of Patent: Dec. 19, 2017

(54) CELLULAR COMMUNICATIONS SPECTRUM MANAGEMENT

(71) Applicant: T-Mobile USA, Inc., Bellevue, WA (US)

(72) Inventors: Neng-Tsann Ueng, Bellevue, WA (US); Karri Mikael Kuoppamaki, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/451,076

(22) Filed: Mar. 6, 2017

(65) Prior Publication Data

US 2017/0245154 A1 Aug. 24, 2017

Related U.S. Application Data

(62) Division of application No. 14/754,470, filed on Jun. 29, 2015, now Pat. No. 9,596,608.

(51) Int. Cl.
| | |
|---|---|
| *H04W 16/14* | (2009.01) |
| *H04W 72/04* | (2009.01) |
| *H04W 72/08* | (2009.01) |
| *H04W 48/10* | (2009.01) |
| *H04W 24/08* | (2009.01) |

(52) U.S. Cl.
CPC ........... *H04W 16/14* (2013.01); *H04W 24/08* (2013.01); *H04W 48/10* (2013.01); *H04W 72/042* (2013.01); *H04W 72/082* (2013.01)

(58) Field of Classification Search
CPC ..... H04W 16/14; H04W 24/08; H04W 12/06; H04W 8/04

USPC ........... 455/435.1, 435.2, 436–439, 454; 370/331–332

See application file for complete search history.

(56) References Cited

U.S. PATENT DOCUMENTS

| | | | |
|---|---|---|---|
| 2010/0323663 | A1 | 12/2010 | Vikberg et al. |
| 2013/0210443 | A1 | 8/2013 | Pedersen et al. |

(Continued)

FOREIGN PATENT DOCUMENTS

| | | |
|---|---|---|
| EP | 2083586 | 7/2009 |
| EP | 2451217 | 5/2012 |

OTHER PUBLICATIONS

Office action for U.S. Appl. No. 14/754,470, dated Jun. 13, 2016, Ueng et al., "Cellular Communications Spectrum Management", 8 pages.

(Continued)

*Primary Examiner* — Cong Tran
(74) *Attorney, Agent, or Firm* — Lee & Hayes, PLLC

(57) ABSTRACT

The techniques described herein enable a commercial cellular service provider to use a repurposed portion of spectrum to provide cellular service to a customer base while ensuring that the use of the repurposed portion of spectrum does not interfere with a previous use of the repurposed portion of spectrum by an incumbent entity. The techniques determine, and manage the use of, forbidden cells and clean cells. A "forbidden" cell is a cell in which a previous use of spectrum by an incumbent entity is protected. A "clean" cell is a cell that can be freely used by the commercial cellular service provider without a possibility of interference with a protected use of the spectrum by the incumbent entity.

18 Claims, 7 Drawing Sheets

(56) References Cited

U.S. PATENT DOCUMENTS

| | | |
|---|---|---|
| 2013/0217402 A1 | 8/2013 | Lin |
| 2014/0171135 A1 | 6/2014 | Fan et al. |
| 2015/0055541 A1* | 2/2015 | Zhang ................ H04W 72/005 |
| | | 370/312 |
| 2015/0141004 A1 | 5/2015 | Cheekatla et al. |
| 2015/0312844 A1 | 10/2015 | Dalsgaard et al. |
| 2016/0165604 A1* | 6/2016 | Khawer ................ H04W 16/14 |
| | | 455/452.1 |
| 2016/0381564 A1 | 12/2016 | Ueng et al. |
| 2017/0078983 A1* | 3/2017 | Ahn ...................... H04W 52/34 |
| 2017/0118748 A1* | 4/2017 | Kalhan ............. H04W 72/0413 |

OTHER PUBLICATIONS

PCT Search Report and Written Opinion dated Sep. 12, 2016 for PCT application No. PCT/US2016/038016, 10 pages.

\* cited by examiner

CELLULAR COMMUNICATIONS SPECTRUM MANAGEMENT

CROSS REFERENCE TO RELATED APPLICATIONS

This patent application is a divisional application of co-pending, commonly owned U.S. patent application Ser. No. 14/754,470, filed Jun. 29, 2015. Application Ser. No. 14/754,470 is fully incorporated herein by reference.

BACKGROUND

Modern telecommunication systems include heterogeneous mixtures of second, third, and fourth generation (2G, 3G, and 4G) cellular-wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

A cellular-wireless network (e.g., may also be referred to as mobile network) includes multiple communication cells or "cells", where an individual cell is associated with an area of coverage. A cell may be served by one or more fixed location transceivers equipped in a base station. A base station at a fixed location can be configured into multiple cells. Moreover, a cell may be associated with a portion of spectrum (e.g., a set of frequencies). Accordingly, as used herein a first cell may differ from a second cell by being associated with a different base station or by using a different portion of spectrum. Stated another way, the first cell and the differing second cell: (i) may be served by the same base station, but may use different portions of spectrum, (ii) may be served by different base stations set up in different geographic coverage areas, but may use the same portion of spectrum on the different base stations, or (iii) may be served by different base stations and may use different portions of spectrum. In some instances, differing cells may be served by the same base station, and may use the same portion of spectrum but different sector-areas.

Conventionally, the total spectrum available for cellular communication within a particular geographic coverage area is allocated, for example, by a regulatory entity (e.g., the United States Federal Communications Commission or FCC). Further, the regulatory entity may split up the total available spectrum into multiple portions of spectrum, which may also be referred to as frequency "blocks". Consequently, a base station (or a group of base stations) that are located within the particular geographic coverage area may be allocated use of various portions of spectrum within that particular geographic coverage area. In one specific example, a regulatory entity may determine that ninety megahertz (90 MHz) may be the total amount of allocated spectrum for cellular communications (e.g., as opposed to television broadcasting or maritime communications that also use spectrum) and the regulatory entity may further determine that a size of a portion of the total available spectrum to be ten megahertz (10 MHz). The regulatory entity divides the total available spectrum into various portions so they can be auctioned off to different entities for use (e.g., commercial entities or provider of cellular service).

Because communications between a mobile user device (e.g., a user equipment or UE) and a base station use both up-link transmissions and down-link transmissions, an individual portion of spectrum (e.g., 10 MHz) assigned to one or more entities (e.g., high bidder(s) in an auction), may further be divided, in accordance with Frequency-Division Duplexing (FDD) into a first sub-portion (e.g., 5 MHz) for up-link transmissions and a second sub-portion (e.g., 5 MHz) for down-link transmissions. Accordingly, continuing the specific example from above, a base station or a group of base stations in the particular geographic coverage area may use half of the total available spectrum (e.g., 45 MHz of the 90 MHz) for up-link transmissions and the other half of the total available spectrum (e.g., 45 MHz of the 90 MHz) for down-link transmissions. Consequently, the total available spectrum may be divided into nine portions of spectrum to be auctioned off by the regulatory entity, where each portion of spectrum includes a 5 MHz frequency sub-portion for up-link transmissions and 5 MHz frequency sub-portion for down-link transmissions.

However, prior to auctioning, some of the portions of spectrum may have previously been used for a purpose other than "commercial" cellular communications, where commercial cellular communications are based on service providers providing cellular service to mobile devices of subscribing users. Stated another way, these portions of spectrum to be auctioned may have been repurposed for commercial cellular communications. In some instances, the previous entity that used the portion of spectrum before the repurposing (e.g., an "incumbent" entity) may not have completely exited the portion of spectrum, and therefore, may still be using the portion of spectrum for a short period of time or an extended period of time after it has been repurposed and allocated to a commercial cellular service provider. In instances where the incumbent entity is a protected entity (e.g., a government entity such as the United States Department of Defense), the regulatory entity may issue policies requiring that the new entity (e.g., the commercial cellular service provider) using the repurposed portion of spectrum not interfere with a "protected" use of the repurposed portion of spectrum by the incumbent entity. Accordingly, the new entity is presented with a problem of using the repurposed portion of spectrum yet avoiding interference with use of the repurposed portion of spectrum by an incumbent entity.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

The techniques described herein enable a new entity (e.g., a commercial cellular service provider) to use a repurposed portion of spectrum to provide cellular service to a customer base while ensuring that the use of the repurposed portion of spectrum does not interfere with a protected use of the repurposed portion of spectrum by an incumbent entity. Consequently, the new entity is able to use the repurposed portion of spectrum without violating requirements or policies that protect use of the repurposed portion of spectrum by the incumbent entity.

In various examples, the techniques described herein determine whether spectrum repurposed for cellular communications is associated with a forbidden cell or a clean cell. A "forbidden" cell is a cell associated with protected repurposed spectrum used by an incumbent entity, as discussed above. A "clean" cell is a cell associated with spectrum that can be freely used by the new entity (e.g., a commercial cellular service provider that bid on and won the allocation of spectrum) without concerns of interference with a protected use of the repurposed portion of spectrum by an incumbent entity.

As discussed above, use of a repurposed portion of spectrum by an incumbent entity (e.g., the United States Department of Defense) may be protected due to its importance (e.g., for National security). However, the incumbent entity may only use the sub-portion of spectrum (e.g., 5 MHz) allocated for up-link communications. Consequently, the corresponding sub-portion of spectrum (e.g., the other 5 MHz) allocated for down-link communications is available for use by the new entity without concerns of interference with the protected use by the incumbent entity.

Accordingly, the techniques discussed herein allow (i) up-link transmissions from a user equipment (UE) to a base station only using clean cell(s) (not forbidden cell(s)) and (ii) down-link transmissions from the base station to the user equipment (UE) using clean cell(s) and/or forbidden cell(s). In various examples, the up-link and down-link transmissions are implemented in association with carrier aggregation. As discussed herein, carrier aggregation enables a UE to use spectrum allocated to more than one cell. For instance, a UE may use a first cell for up-link transmissions with a base station and the same UE may use a different cell for down-link transmissions with the base station. Carrier aggregation may be used in order to increase bandwidth for up-link and/or down-link transmissions, thereby improving speed associated with cellular communications. In one specific example, using carrier aggregation (e.g., a combination of a clean cell and a forbidden cell), the amount of time it takes to download data to a UE via a base station may be reduced by up to fifty percent.

Figure 1:
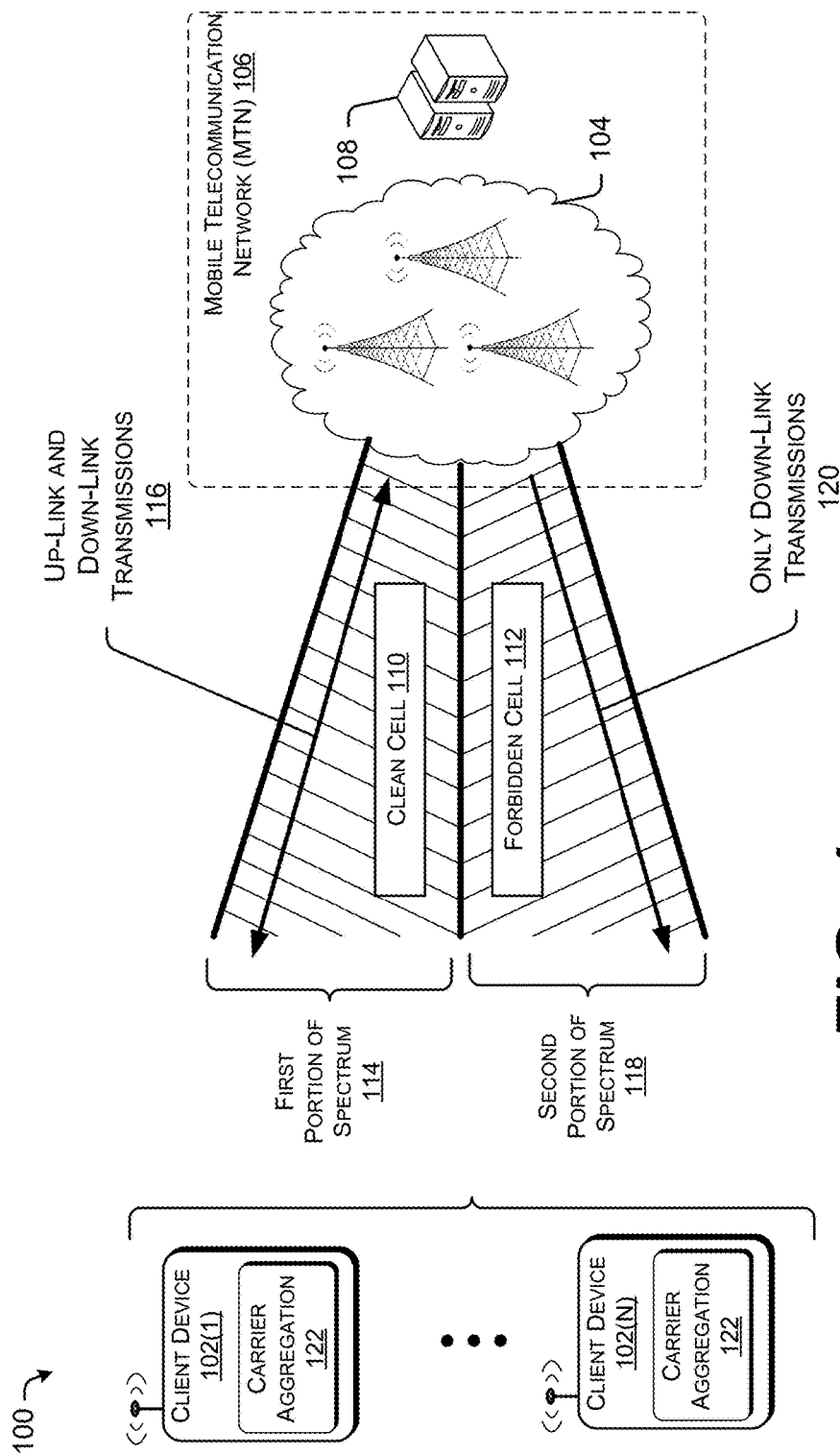
FIG. 1 depicts an illustrative environment in which client devices (e.g., UEs) are configured to communicate with base station(s) using a clean cell and/or a forbidden cell.

FIG. 1 depicts an illustrative environment 100 where client devices 102(1) . . . 102(N) are configured to communicate with one or more base station(s) 104. The base station(s) 104 may be part of a mobile telecommunications network (MTN) 106, that may ultimately provide access for the client devices 102(1) . . . 102(N) to one or more data servers 108 (e.g., Web servers, content servers, file servers, etc.). To this end, an individual client device 102(1) . . . 102(N) (herein referred to as client device 102 or UE) may include, but is not limited to, a smartphone device, a cell phone device, a tablet computer device, a laptop computer device, a mobile hotspot device, a personal digital assistant (PDA) device, an electronic book device, a handheld gaming device, a personal media player device, or any other portable or mobile electronic device that may generate voice and/or digital data, request voice and/or digital data over the MTN 106, receive voice and/or digital data over the MTN 106, and/or exchange voice and/or digital data over the MTN 106. Moreover, the client device 102 may operate in accordance with a service or a subscription plan offered by a commercial cellular service provider and purchased by a user of the client device 102.

Base station(s) 104 is/are configured to operate and/or serve one or more clean cell(s) and one or more forbidden cell(s). For purposes of illustration, a single clean cell 110 and a single forbidden cell 112 are shown in FIG. 1.

As discussed above, the clean cell 110 is associated with a first portion of spectrum 114 and a client device 102 may use the clean cell 110 for both up-link and down-link transmissions 116. Accordingly, as further discussed herein, the base station(s) 104 may be configured to allow the client device 102 to use the clean cell 110 for both up-link and down-link transmissions 116. In various examples, the first portion of spectrum 114 of the clean cell 110 comprises 10 MHz of frequency and uplink-transmissions may use a first 5 MHz sub-portion (e.g., a 5 MHz frequency block) of the 10 MHz of frequency and the down-link communications may use the other (second) 5 MHz sub-portion (e.g., the other 5 MHz frequency block) of the 10 MHz of frequency.

Furthermore, the forbidden cell 112 is associated with a second portion of spectrum 118 that is different than the first portion of spectrum 114, and the client device 102 may use the forbidden cell 112 only for down-link transmissions 120. Accordingly, as further discussed herein, the base station(s) 104 may be configured to only allow the client device 102 to use the forbidden cell 112 for down-link transmissions 120. In various examples, the second portion of spectrum 118 of the forbidden cell 112 may also comprise 10 MHz of frequency and up-link transmissions may use a first 5 MHz sub-portion (e.g., block) of the 10 MHz of frequency and the down-link transmissions may use the other (second) 5 MHz sub-portion (block) of the 10 MHz of frequency. Therefore, the first sub-portion of the second portion of spectrum 118 associated with up-link transmissions may be forbidden from being used due to the potential of interference with a protected use of an incumbent entity (e.g., the Department of Defense). However, since an incumbent entity may not use the second portion of spectrum for down-link transmissions, the second sub-portion of the second portion of spectrum 118 associated with down-link transmissions may be available for use by the client device because there is no chance of interference with the protected use of the incumbent entity.

In various implementations, a client device 102 is enabled to implement carrier aggregation 122. There are different types of carrier aggregation that may be implemented.

A first type of carrier aggregation includes inter-band non-contiguous carrier aggregation which uses different portions of spectrum to implement up-link transmissions and down-link transmissions (e.g., a first portion of spectrum and a second portion of spectrum). Inter-band non-contiguous carrier aggregation may be used when the portions of spectrum are fragmented (e.g., are not continuous with one another or not adjacent to one another). To implement inter-band non-contiguous carrier aggregation, an individual UE may be equipped with multiple transceivers—one to tune to and communicate via a first portion of spectrum (e.g., send up-link/down-link transmissions to a base station) and another to tune to and communicate via a second portion of spectrum (e.g., receive down-link transmissions from the base station). In one example, the first portion of spectrum (e.g., 10 MHz of frequency) may belong to a first cell (e.g., a primary cell) and the second portion of spectrum (e.g., 10 MHz of frequency) may belong to a second cell (e.g., a secondary cell).

A second type of carrier aggregation includes intra-band carrier aggregation. Intra-band carrier aggregation may use either one of two different formats. A first format of intra-band carrier aggregation includes intra-band contiguous carrier aggregation in which portions of spectrum associated with component carriers are adjacent to one another (e.g., a first 10 MHz frequency portion and a second 10 MHz frequency portion are next to one another). Using intra-band contiguous carrier aggregation, a radio frequency channel used by the UE may be a single enlarged channel and the UE may use only one transceiver instead of two transceivers. A second format of intra-band carrier aggregation includes intra-band non-contiguous carrier aggregation in which a portion of spectrum may serve two component carriers and frequencies used to transmit information within the portion of spectrum are separated from one another (e.g., are not adjacent or are not contiguous). To implement intra-band non-contiguous carrier aggregation, an individual UE may be equipped with multiple transceivers.

The MTN 106 may be configured to implement one or more of the second, third, and fourth generation (2G, 3G, and 4G) cellular-wireless access technologies discussed above. Thus, the MTN 106 may implement GSM, UMTS, and/or LTE/LTE Advanced telecommunications technologies. Different types of MTN nodes used in the GSM, UMTS, LTE, LTE Advanced, and/or HSPA+ telecommunications technologies may include, but are not limited to, a combination of: base stations 104 (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate and/or route data between (i) the client device 102 and (i) peer client device(s) or data servers 108, for example. While FIG. 1 illustrates an MTN 106, it is understood in the context of this document, that the techniques discussed herein may also be implemented in association with other networking technologies as well, such as nodes that are part of a wide area network (WAN), metropolitan area network (MAN), local area network (LAN), neighborhood area network (NAN), personal area network (PAN), or the like.

Figure 2:
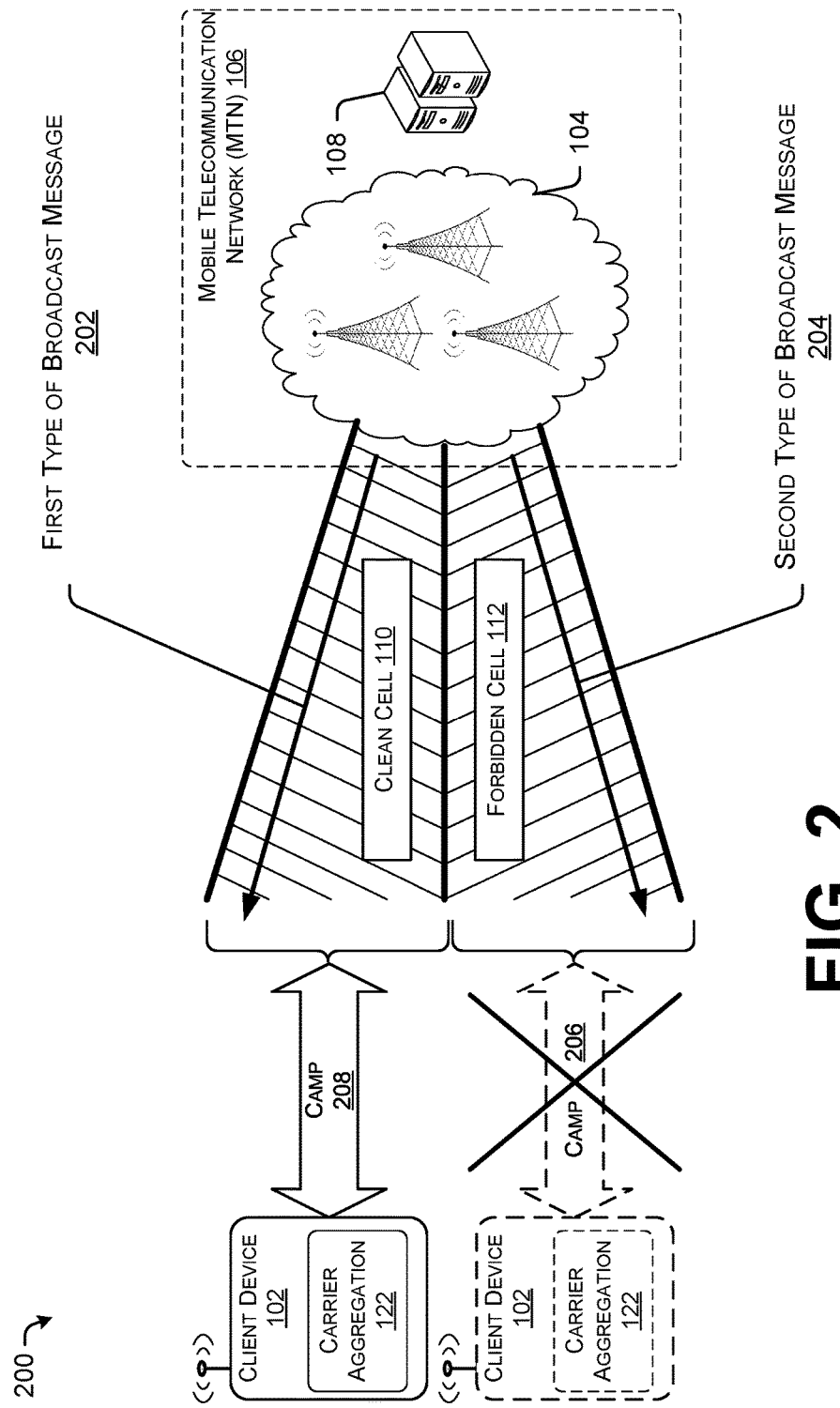
FIG. 2 depicts an illustrative environment in which a client device identifies a suitable cell from multiple cells providing service for a particular geographic coverage area in which the client device is currently located.

FIG. 2 depicts an illustrative environment 200 in which a client device 102 identifies a suitable cell from multiple cells providing service for a particular geographic coverage area in which the client device 102 is currently located. For instance, upon being switched on or upon entering the geographic coverage area, the client device may look through a spectrum band to identify the suitable cell to monitor. Monitoring, or listening to, the identified cell may be referred to as "camping" (e.g., in an idle mode of operation). A suitable cell may be one that belongs to a commercial cellular service provider to which the client device is subscribed via a service plan. In instances where the commercial cellular service provider with which the client device is subscribed has not built a cell within the particular geographic coverage area, a suitable cell may belong to "roaming" partners of the commercial cellular service provider. After identifying a suitable cell to monitor, the client device is aware of parameters (e.g., a frequency band) to be used in an event the client device initiates communications with the base station (e.g., a voice call, a text message, a request to download data or to upload data, etc.). Stated another way, the client device may use the parameters to prepare for communications with the base station.

To illustrate a specific example, a client device 102 configured in association with a TMobile® service plan may include hardware/software (e.g., a subscriber identity module (SIM) card) that directs it to first search for a cell that belongs to T-Mobile®. If a cell that belongs to T-Mobile® cannot be found, the client device may search for a cell that belongs to an entity that has partnered with TMobile® to provide cellular service in a geographic coverage area where TMobile® has no allocated spectrum.

As shown in FIG. 2, base station(s) 104 continually issues broadcast messages so the client device 102 can identify a suitable cell. A broadcast message may be issued in association with an individual cell and the broadcast message may include information that the client device 102 can use to determine whether the individual cell is a suitable cell. Therefore, in association with clean cell 110, base station(s) 104 is/are configured to issue a first type of broadcast message 202 indicating, to the client device 102, that the cell is clean and/or up-link transmissions are permissible for the clean cell 110. In contrast, in association with forbidden cell 110, base station(s) 104 is/are configured to issue a second type of broadcast message 204 indicating that the cell is forbidden and/or up-link transmissions are not permissible for the forbidden cell 112.

Responsive to receiving and processing the broadcast messages, the client device 102 knows it is unable to camp 206 (e.g., as illustrated by the "X") on the forbidden cell 112 because of the potential of interference with a protected use of an incumbent entity, but it is able to camp 208 on the clean cell 110.

Figure 3:
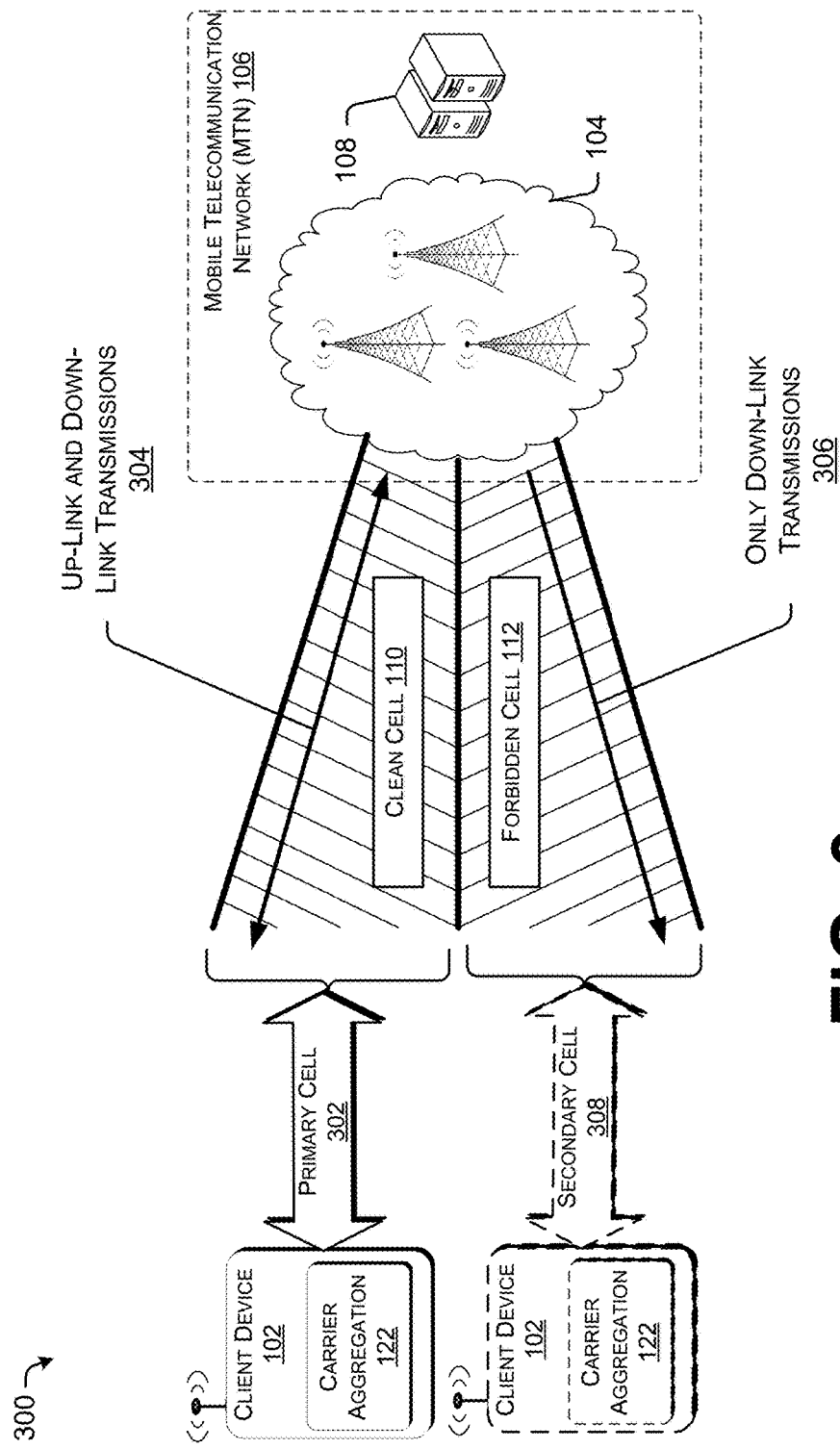
FIG. 3 depicts an illustrative environment in which a client device uses a clean cell as a primary cell for up-link and/or down-link communications and uses a forbidden cell as a secondary cell for down-link communications only.

FIG. 3 depicts an illustrative environment 300 in which a client device 102 uses a clean cell as the primary cell for up-link and/or down-link transmissions and uses a forbidden cell as a secondary cell for down-link transmissions only. In FIG. 3, the client device 102 is configured to first monitor or listen to (e.g., camp) the clean cell 110, which may be a cell allocated as the primary cell 302. The client device 102 may use the clean cell 110 to perform both up-link and down-link transmissions 304 without a possibility of interference with a protected use of an incumbent entity. However, the client device 102, via the carrier aggregation 122 discussed above, may also be configured to use the forbidden cell 112 to perform only down-link transmissions. The forbidden cell 112 may be allocated as a secondary cell 308, and thus, via carrier aggregation 122, the client device 102 is able to download data via the secondary cell 308. Therefore, in a specific example, the client device 102 may first send a request to download data via the clean cell 110 (e.g., because this may be considered an up-link transmission), or the base station may notify the client device of data available to receive (e.g., to be downloaded by the client device), and then the base station(s) 104 may determine that resources (e.g., the forbidden cell 112) are available for use to download the data.

Figure 4:
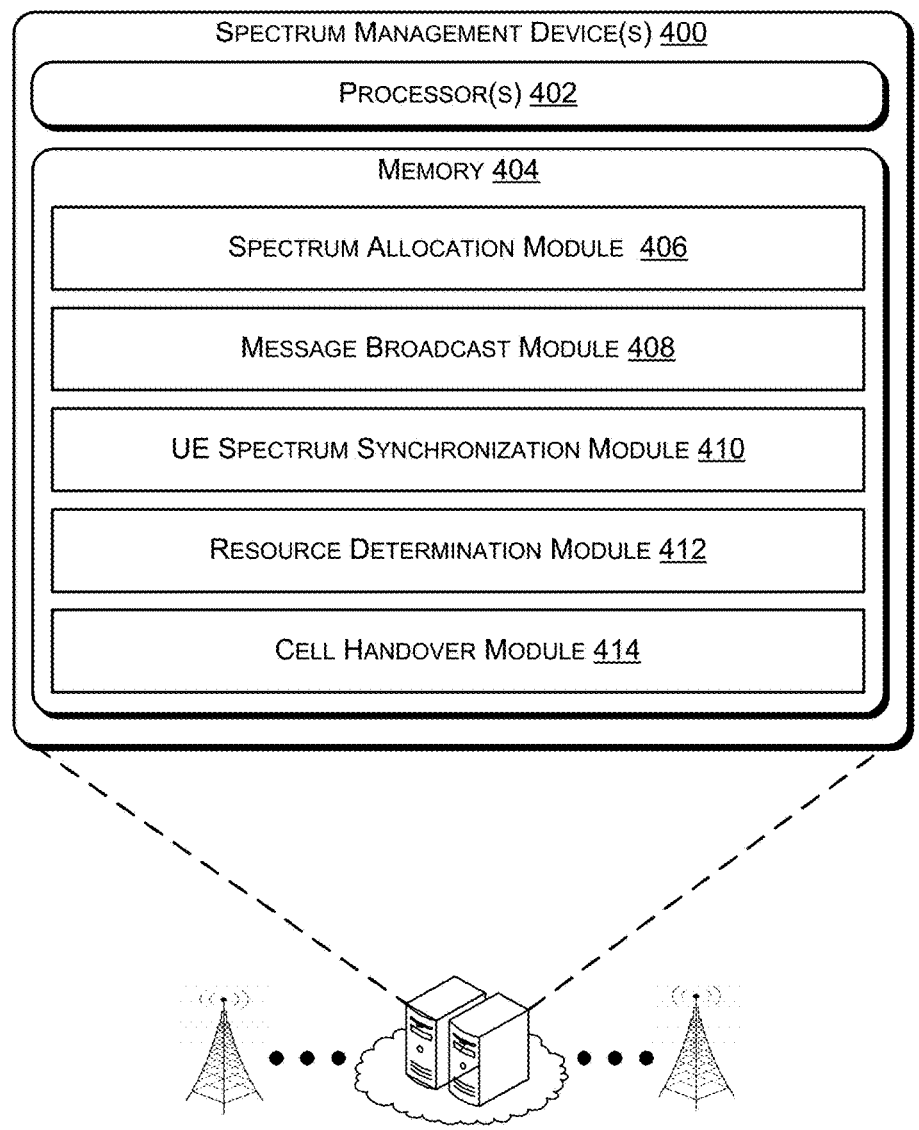
FIG. 4 depicts example components of one or more spectrum management device(s) that are associated with base station(s) and that are individually configured to communicate with a client device using a clean cell and/or a forbidden cell.

FIG. 4 illustrates example components of one or more spectrum management device(s) 400. A spectrum management device 400 may be associated with base station(s) 104. For example, a spectrum management device 400 may be located locally at a base station 104 or a spectrum management device 400 may be located remotely from a base station 104 and control the base station via network communications.

The spectrum management device 400 includes one or more processor(s) 402 and memory 404. Processor(s) 402 may include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 402 may be configured to fetch and execute computer-readable instructions stored in the memory 404.

The memory 404 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transmission mechanism.

The memory 404 of the spectrum management device 400 may include one or more of: a spectrum allocation module 406, a message broadcast module 408, user equipment (UE) synchronization module 410, a resource determination module 412, and/or a cell handover module 414. As used herein, the term "module" is intended to represent example divisions of executable instructions for purposes of discussion, and is not intended to represent any type of requirement or required method, manner or organization. Accordingly, while various "modules" are discussed herein with respect to FIG. 4, their functionality and/or similar functionality could be arranged differently (e.g., combined into a fewer number of modules, broken into a larger number of modules, etc.). Further, while certain functions and modules may be described herein as being implemented by software and/or firmware executable on a processor, in other embodiments, any or all of the modules may be implemented in whole or in part by hardware (e.g., a specialized processing unit, etc.) to execute the described functions.

The spectrum allocation module 406 is configured to determine the portions of spectrum that are available for use by base station(s) 104 that serve a geographic coverage area (e.g., an inexact area such as a neighborhood, part of a zip code, part of a city, etc.). As discussed above, the portions of spectrum may be of equal or similar size (e.g., 10 MHz frequency portions) that are based on a division of a total amount of spectrum (e.g., 90 MHz) designated for cellular communications by a regulatory entity such as the FCC. As part of the determination process, the spectrum allocation module 406 may identify which respective portion(s) of spectrum have been allocated to which respective entities. For example, using an auction and bidding process, a first portion of spectrum may have been allocated to a first commercial cellular service provider, a second portion of spectrum may have been allocated to a second commercial cellular service provider, a third and a fourth portion of spectrum may both have been allocated to a third commercial cellular service provider, and so forth.

Additionally, the spectrum allocation module 406 may be tasked with identifying portions of spectrum that have been repurposed from a previous use that is protected. Stated another way, the spectrum allocation module 406 may identify a portion of spectrum that may continue to be used by an incumbent entity (e.g., the United States Department of Defense) and for which a previous use of the portion of spectrum is protected and should not be interfered with based on defined rules and/or policies. Accordingly, the spectrum allocation module 406 may receive, for example, from a regulatory entity, information associated with an identification of an incumbent entity and/or a protected use. The spectrum allocation module 406 may use the received information to classify (e.g., label, categorize, etc.) individual portions of spectrum for one or more base station(s) as being "clean" (e.g., clean cell 110 associated with the first portion of spectrum 114) or "forbidden" (e.g., forbidden cell 112 associated with the second portion of spectrum 118).

The message broadcast module 408 is configured to generate and broadcast system information messages to UEs. For example, the message broadcast module 408 may use the classification information (e.g., clean or forbidden) of an individual cell to generate and send the system information message with an indication of whether a cell is clean or forbidden. Therefore, a UE can receive a broadcasted system information message and determine whether (i) a cell is clean (e.g., clean cell 110) and camping is permissible (e.g., reference 208 in FIG. 2) based on reception of a first type of broadcast message 202 or (ii) a cell is forbidden (e.g., forbidden cell 112) and camping is not permissible (e.g., reference 206 in FIG. 2) based on reception of a second type of broadcast message 204.

The user equipment (UE) synchronization module 410 is configured to determine that a particular UE has identified a suitable clean cell to camp on, and therefore, communications with the particular UE can be established using the portion of spectrum associated with the suitable clean cell. A suitable clean cell may be one that belongs to a commercial cellular service provider to which the UE is subscribed via a service plan. Or, in instances where the commercial cellular service provider with which the UE is subscribed has not been allocated a clean cell within a particular geographic coverage area, a suitable clean cell may belong to a partner entity (e.g., a "roaming" partner) of the commercial cellular service provider.

In various examples, the user equipment (UE) synchronization module 410 is also configured to receive, from the UE, information regarding capabilities of the UE. For example, the information may indicate, and inform the user equipment (UE) synchronization module 410, that the UE is capable of carrier aggregation (e.g., the UE includes multiple transceivers to implement inter-band non-contiguous carrier aggregation).

The resource determination module 412 is configured to determine instances or situations where data communication speeds can increase (e.g., download speeds) and latency can be reduced by determining when additional resources are available for data transmissions. In this context, an available "resource" may be associated with the availability of a forbidden cell that can be used for down-link transmissions, but not up-link transmissions that may cause interference with a protected use of the forbidden cell by an incumbent entity. Therefore, the resource determination module 412 may receive an indication that a UE has requested, e.g., via a clean cell, to implement communications (e.g., a voice call, a text message, or a request to upload or download data such as video content, gaming content, social media content, an application or "app", an operating system update, a photo, etc.), or the resource determination module 412 may receive an indication that there is data available for the UE to receive (e.g. to be downloaded by the UE). In one example, the UE request may be received by the user equipment (UE) synchronization module 410 via the clean cell, because the UE request is an up-link transmission, and then the resource determination module 412 may receive the indication of the UE request from the user equipment (UE) synchronization module 410. In response, the resource determination module 412 may determine that use of a forbidden cell associated with base station(s) 104 is available for the down-link transmissions associated with the UE request. The resource determination module 412 may subsequently send a resource allocation message to the UE indicating that an additional resource (e.g., a forbidden cell) is to be used for the down-link transmissions while the clean cell is to be used for the up-link transmissions so interference with a protected use can be avoided.

In various examples, the identification of an additional resource by the resource determination module 412 is based on the ability of the UE to perform carrier aggregation. For instance, the UE may have provided information indicating that the UE includes multiple transceivers to implement inter-band non-contiguous carrier aggregation.

After informing the UE of the additional resource allocation, the user equipment (UE) synchronization module 410 may implement up-link and down-link transmissions using a clean cell and a forbidden cell. For example, the UE may use the clean cell for up-link and/or down-link transmissions while the UE may only use the forbidden cell for down-link transmissions so that interference with a protected, up-link transmission only, use of an incumbent entity is not interfered with.

In various examples, the cell handover module 414 is configured to handover (e.g., pass) a UE from one base station to another base station, for example, as the UE moves (e.g., a user is driving a car). As the UE moves, the cell handover module 414 may identify a new suitable cell (e.g., a clean cell) associated with a different coverage area on which the UE can camp. Therefore, the cell handover module 414 may be configured so that a UE is not handed over to a forbidden cell associated with a base station located in the different coverage area into which the UE has moved.

Figure 5:
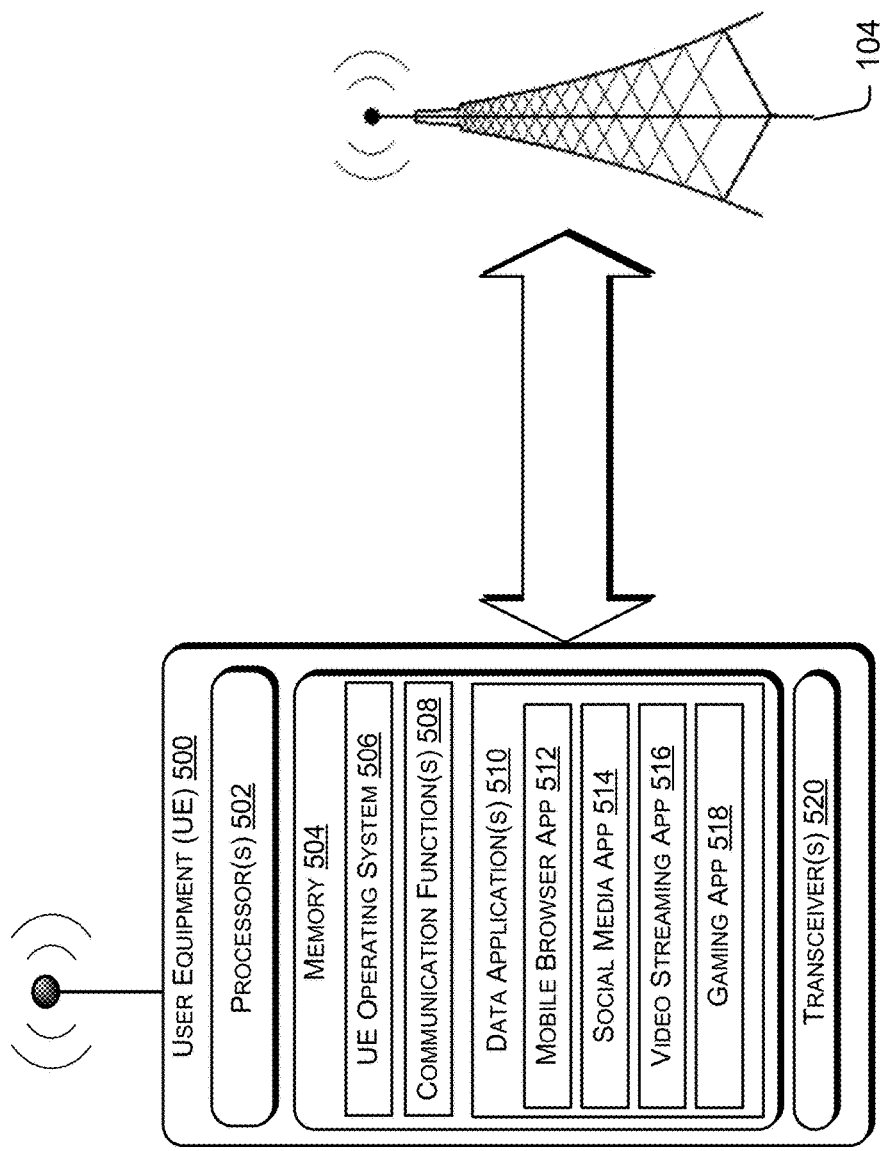
FIG. 5 depicts example components of a client device that is configured to communicate with a base station using a clean cell and/or a forbidden cell.

FIG. 5 illustrates example components of a client device 102 (e.g., a user equipment 500). For example, the UE 500 may include one or more processor(s) 502 and memory 504. Various types of processor(s) 502 and memory 504 are discussed above with respect to the processor(s) and the memory of FIG. 4. The memory 504 of the UE 500 includes an operating system (OS) 506, which is configured to manage hardware and services within and coupled to the UE 500 for the benefit of other modules or components. For instance, the OS 506 may include, but is not limited to, a Microsoft Windows Mobile® OS, a Google Android® OS, an Apple iOS® OS, a Linux Mobile® OS, as well as any other common mobile device OS.

The memory 504 may also store module(s) associated with communication function(s) (e.g., voice calls, text messaging, etc.). Additionally, the memory 504 may include data application(s) 510. For example, the data applications 510 may include, but are not limited to, a mobile browser application 512, a social media application 514, a video streaming application 516, a gaming application 518. Other types of applications may include a video conferencing application, an email application, a banking application, or any other application that is configured to generate and exchange data with data servers 108 over the MTN 106. During execution by the processor(s) 502 of the UE 500, each of the data applications 110 may be configured to cause the UE 500 to initiate data communications with the data servers 108 over the MTN 106 and via a base station 104.

The UE may also comprise one or more transceiver(s) 520. A transceiver 520 is configured to register the UE with a network, for example, via base station 104. Moreover, the transceiver 520 is configured to receive system information broadcast messages from the base station 104 indicating that an individual communication cell is a clean cell or a forbidden cell. The transceiver 520 may use the received system information broadcast messages to camp on a clean cell and to avoid camping on a forbidden cell.

In various examples, a transceiver 520 may communicate, to the base station, information indicating that the UE is capable of carrier aggregation. For instance, the information may indicate that the UE is equipped with two or more transceivers and that the UE is capable of carrier aggregation (e.g., inter-band non-contiguous carrier aggregation). In response to receiving a resource allocation message indicating that a forbidden cell is to be used for down-link transmissions, at least one transceiver may be adjusted (e.g., tuned) to receive down-link data transmissions via the portion of spectrum associated with the forbidden cell, while another transceiver may be tuned to send up-link data transmissions via a different portion of spectrum associated with the clean cell.

Figure 6:
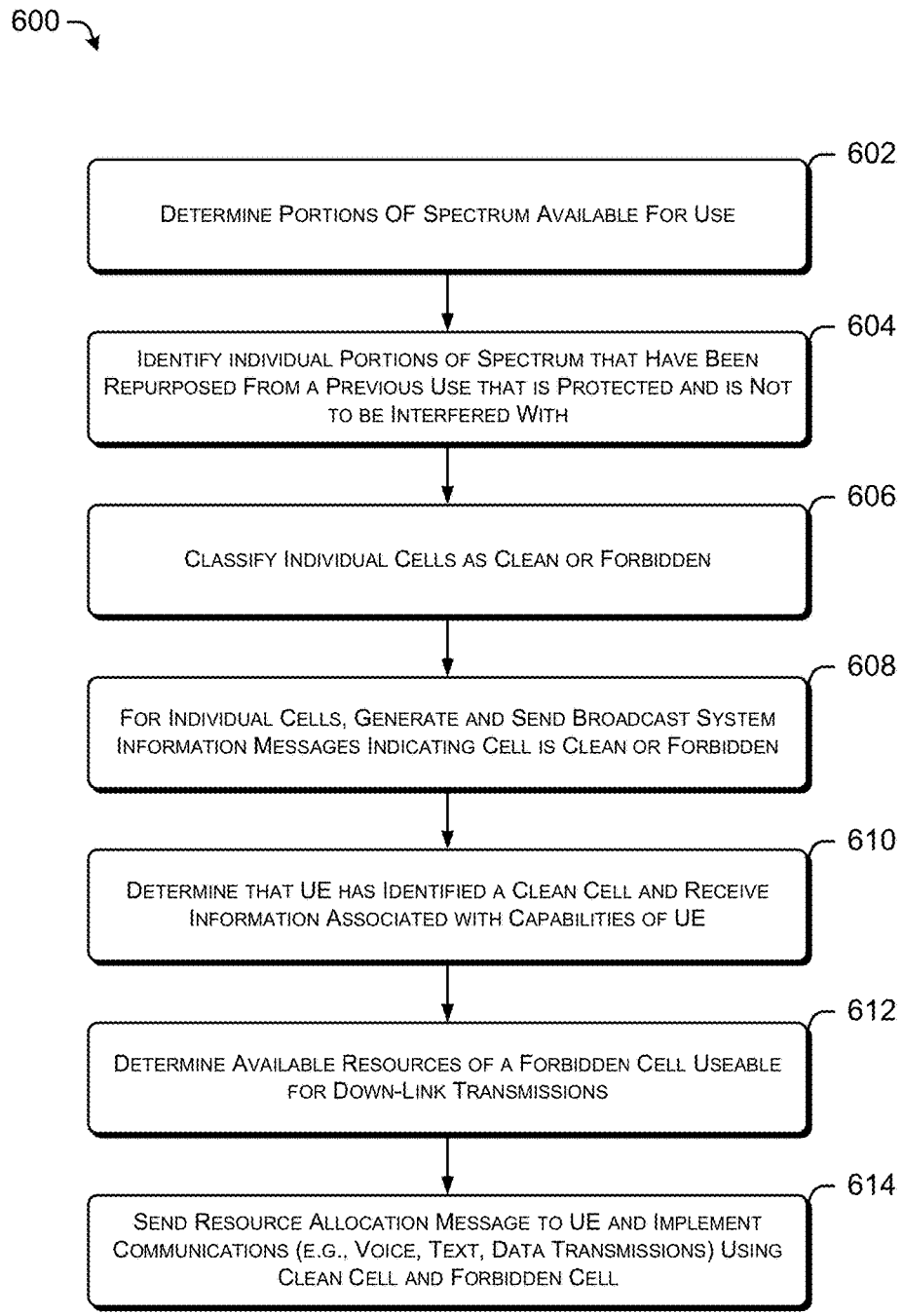
FIG. 6 is a flow chart of an example process for communicating with a client device using a clean cell and/or a forbidden cell.
Figure 7:
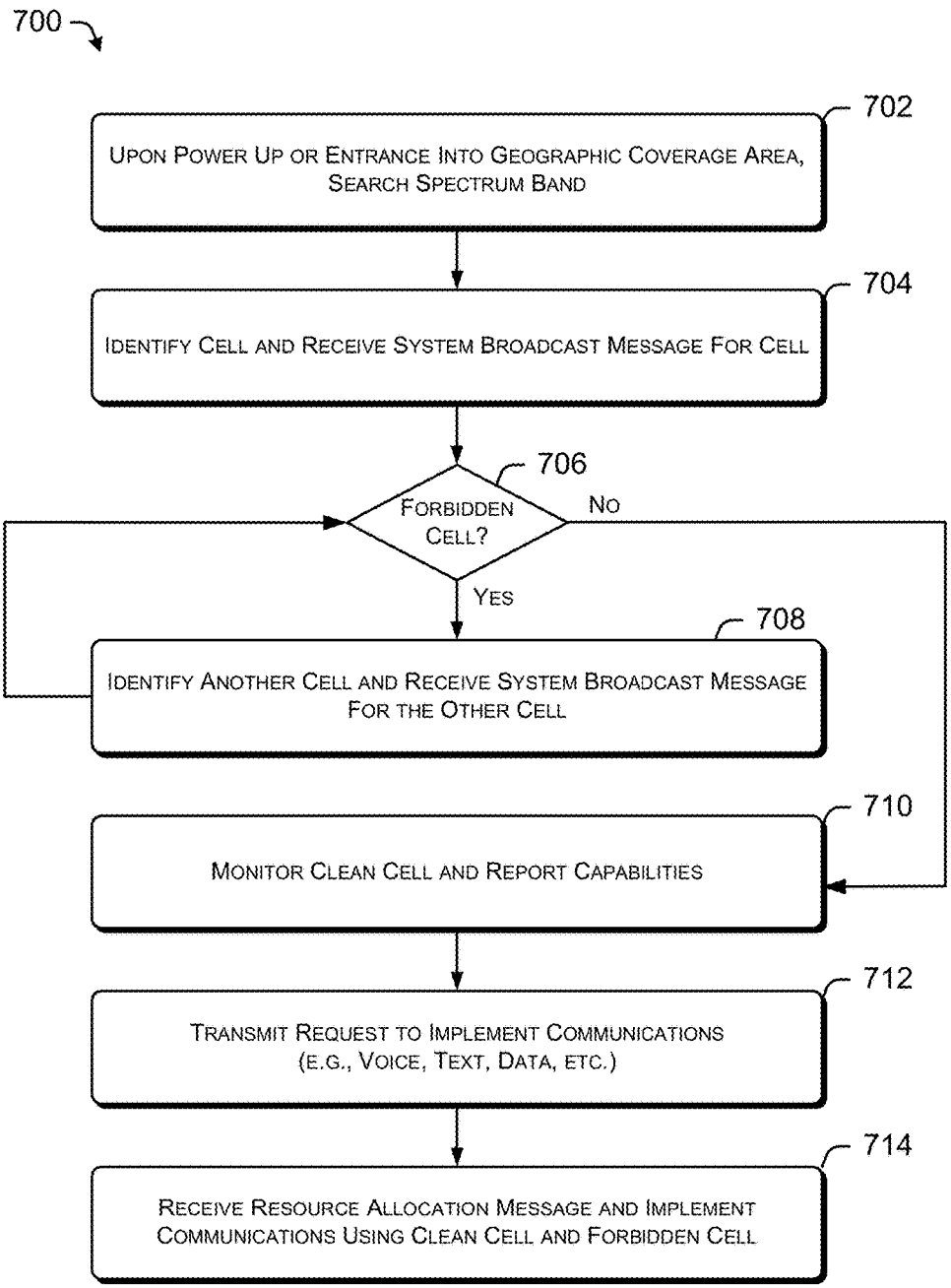
FIG. 7 is a flow chart of an example process for communicating with a base station using a clean cell and/or a forbidden cell.

FIGS. 6 and 7 present illustrative processes, where each process is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes in FIGS. 6 and 7 may be implemented in association with the description of any one of FIGS. 1-5.

FIG. 6 shows a flow diagram of an example process 600 for communicating with a client device using a clean cell and/or a forbidden cell. The example process 600 may be performed by the components (e.g., the modules) of the spectrum management device 400 associated with one or more base station(s) 104. However, the example process 600 may be performed by other devices as well.

At 602, portions of spectrum available for cellular communication use are determined. For instance, the spectrum allocation module 406 may determine that divisions (e.g., equal 10 MHz frequency portions) of a total available amount of spectrum (e.g., 90 MHz) are associated with various carriers.

At 604, individual portions of spectrum that have been repurposed from a previous use that is protected and is not to be interfered with are identified. For example, the spectrum allocation module 406 may identify the individual portions of spectrum based on rules and/or policies set by a regulatory entity.

At 606, individual cells are classified as being clean or forbidden, for example, based on the identification of the individual portions of spectrum that have been repurposed from a previous use that is protected and is not to be interfered with. Accordingly, a base station may comprise multiple communication cells, where one or more of the communication cells are clean cells and one or more of the communication cells are forbidden cells.

At 608, broadcast system information messages indicating whether a cell is clean or forbidden are generated and sent out (e.g., broadcasted to various client devices within an area of coverage served by a base station).

At 610, it is determined that a client device (or UE) has identified a clean cell as a suitable cell on which to camp, and then information associated with capabilities (e.g., carrier aggregation) of the client device is received.

At 612, in response to receiving a request from the client device, or based on an indication that there is data available for the client device to receive (e.g., data to be downloaded by the client device), available resources (e.g., bandwidth) of a forbidden cell useable for down-link transmissions are determined.

At 614, a resource allocation message is sent to the client device, and communications (e.g., data transmissions) are implemented using the clean cell (e.g., up-link transmissions and/or down-link transmissions) and the forbidden cell (e.g., down-link transmissions only).

FIG. 7 shows a flow diagram of an example process 700 for communicating with a base station using a clean cell and/or a forbidden cell. The example process 700 may be performed by the components of the computing device 102 (e.g., the user equipment 500).

At 702, upon power up or upon entrance into a particular geographic coverage area, a client device (e.g., a transceiver 520) may search a spectrum band made available to the client device by a base station associated with the particular geographic coverage area.

At 704, a cell is identified (e.g., from the spectrum band) and a system broadcast message for the cell is received at the client device.

At decision 706, it is determined, from the system broadcast message, whether the identified cell is a forbidden cell. If "yes" at 706, then the process proceeds to 708 where the client device identifies another cell receives another system broadcast message for the other cell. At this point, the process returns to decision 706. If "no" at 706 (e.g., the identified cell is a clean cell), then the process proceeds to 710 where the client device monitors the clean cell (e.g., camps idly on the clean cell until it initiates communications or until it receives communications) and reports its capabilities.

At 712, the client device transmits a request to implement communications (e.g., a voice call, a text message, a data communication, etc.).

At 714, the client device receives a resource allocation message and implements communications using a clean cell and a forbidden cell. For example, the client device may tune a first transceiver to send up-link data transmissions via the clean cell and the client device may tune a second transceiver to receive down-link data transmissions via the forbidden cell.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
one or more processors;
one or more transceivers; and
memory storing instructions that, when executed by the one or more processors, configure the device to:
receive a system broadcast message indicating that a communication cell is a clean communication cell associated with a first portion of spectrum assigned to an entity;
monitor the clean communication cell;
transmit a request to perform communications in which data is to be transmitted using both up-link transmissions and down-link transmissions;
receive a resource allocation message indicating that the monitored clean communication cell is to be used for the up-link transmissions to a base station and that a forbidden communication cell is to be used for at least a portion of the down-link transmissions from the base station, the forbidden communication cell being associated with a second portion of spectrum assigned to the entity that is also available for up-link communications by an incumbent entity;
use the clean communication cell for the up-link transmissions to the base station; and
use the forbidden communication cell for the at least the portion of the down-link transmissions from the base station.

2. The device of claim 1, wherein the one or more transceivers comprise at least two transceivers, where:
a first transceiver of the at least two transceivers is tunable to the clean communication cell for sending the up-link transmissions from the device to the base station; and
a second transceiver of the at least two transceivers is tunable to the forbidden communication cell for receiving the down-link transmissions at the device from the base station.

3. The device of claim 1, wherein the second portion of spectrum has been repurposed from a protected use associated with the incumbent entity.

4. The device of claim 3, wherein the protected use comprises protected up-link use and not protected down-link use by the incumbent entity, wherein the up-link transmissions from the device to the base station are not permitted using the forbidden communication cell so that interference with the protected up-link use by the incumbent entity is avoided.

5. The device of claim 1, wherein the clean communication cell is associated with free use of the first portion of spectrum without a possibility of interference with a protected use of the second portion of spectrum by the incumbent entity.

6. The device of claim 1, wherein the instructions further configure the device to send information indicating that the device is capable of carrier aggregation, and wherein the resource allocation message is received in response to sending the information indicating that the device is capable of carrier aggregation.

7. The device of claim 1, wherein the entity is a commercial cellular service provider and the device is a mobile client device subscribed to a cellular service plan offered by the commercial cellular service provider.

8. A method comprising:
identifying, by a client device, a first communication cell associated with a base station;
receiving, at the client device and from a base station, a first system broadcast message associated with the first communication cell;
determining that the first system broadcast message indicates that the first communication cell is a forbidden communication cell associated with a forbidden portion of spectrum assigned to an entity that is also available for up-link communications by an incumbent entity;
identifying, by the client device, a second communication cell associated with the base station;
receiving, at the client device and from the base station, a second system broadcast message associated with the second communication cell;
determining that the second system broadcast message indicates that the second communication cell is a clean communication cell associated with a clean portion of spectrum assigned to the entity;
use the clean communication cell for up-link transmissions to the base station; and
use the forbidden communication cell or another forbidden communication cell only for down-link transmissions from the base station.

9. The method of claim 8, further comprising:
transmitting, from the client device and to the base station, a request to perform communications in which data is to be transmitted using both the up-link transmissions and the down-link transmissions; and
receiving, at the client device and from the base station, a resource allocation message indicating that the clean communication cell is to be used for the up-link transmissions to the base station and that the forbidden communication cell or the other forbidden communication cell is to be used for the down-link transmissions from the base station.

10. The method of claim 8, wherein the forbidden portion of spectrum has been repurposed from a protected use associated with the incumbent entity.

11. The method of claim 10, wherein the protected use comprises protected up-link use and not protected down-link use by the incumbent entity, wherein the up-link transmissions from the client device to the base station are not permitted using the forbidden communication cell so that interference with the protected up-link use by the incumbent entity is avoided.

12. The method of claim 8, wherein the clean communication cell is associated with free use of the clean portion of spectrum without a possibility of interference with a protected use of the forbidden portion of spectrum by the incumbent entity.

13. A non-transitory computer-readable medium having programming instructions stored thereon which, when executed by a device, cause the device to perform operations comprising:
receive a system broadcast message indicating that a communication cell is a clean communication cell associated with a first portion of spectrum assigned to an entity;
monitor the clean communication cell;
transmit a request to perform communications in which data is to be transmitted using both up-link transmissions and down-link transmissions;
receive a resource allocation message indicating that the monitored clean communication cell is to be used for the up-link transmissions to a base station and that a forbidden communication cell is to be used for at least a portion of the down-link transmissions from the base station, the forbidden communication cell being associated with a second portion of spectrum assigned to the entity that is also available for up-link communications by an incumbent entity;
use the clean communication cell for the up-link transmissions to the base station; and
use the forbidden communication cell for the at least the portion of the down-link transmissions from the base station.

14. The non-transitory computer-readable medium of claim 13, wherein the second portion of spectrum has been repurposed from a protected use associated with the incumbent entity.

15. The non-transitory computer-readable medium of claim 14, wherein the protected use comprises protected up-link use and not protected down-link use by the incumbent entity, wherein the up-link transmissions from the device to the base station are not permitted using the forbidden communication cell so that interference with the protected up-link use by the incumbent entity is avoided.

16. The non-transitory computer-readable medium of claim 13, wherein the clean communication cell is associated with free use of the first portion of spectrum without a possibility of interference with a protected use of the second portion of spectrum by the incumbent entity.

17. The non-transitory computer-readable medium of claim 13, wherein the operations further comprise sending information indicating that the device is capable of carrier aggregation, and wherein the resource allocation message is received in response to sending the information indicating that the device is capable of carrier aggregation.

18. The non-transitory computer-readable medium of claim 13, wherein the entity is a commercial cellular service provider and the device is a mobile client device subscribed to a cellular service plan offered by the commercial cellular service provider.

* * * * *